May 14, 1929.   H. B. SMITH   1,712,971
MACHINE FOR SHAPING BOX BLANKS AND SIMILAR PURPOSES
Filed Oct. 26, 1925   8 Sheets-Sheet 1

INVENTOR
H. Bridgman Smith
BY
J. Granville Meyers
ATTORNEY

May 14, 1929.     H. B. SMITH     1,712,971
MACHINE FOR SHAPING BOX BLANKS AND SIMILAR PURPOSES
Filed Oct. 26, 1925     8 Sheets-Sheet 2

INVENTOR
H. BRIDGMAN SMITH
BY
ATTORNEY

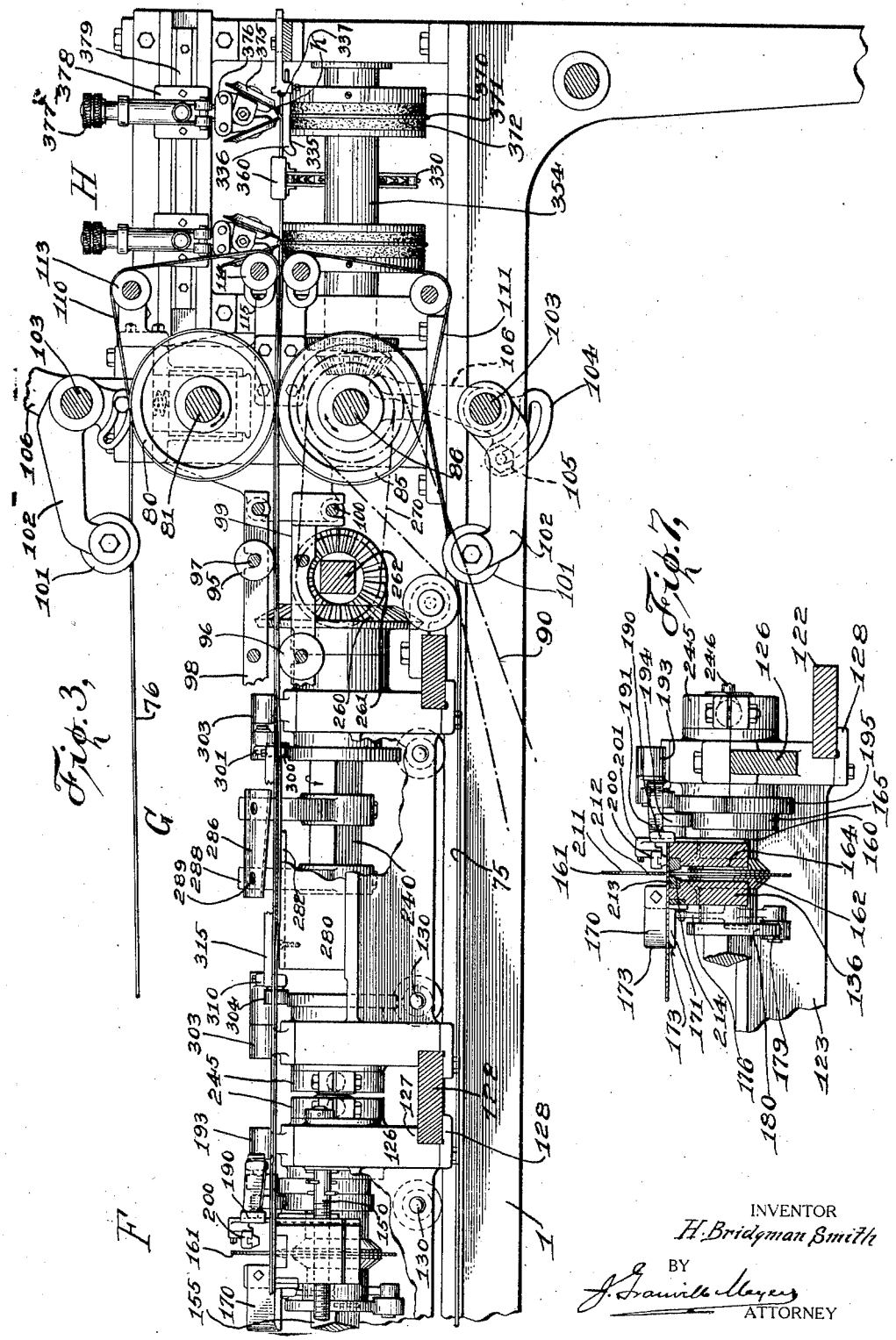

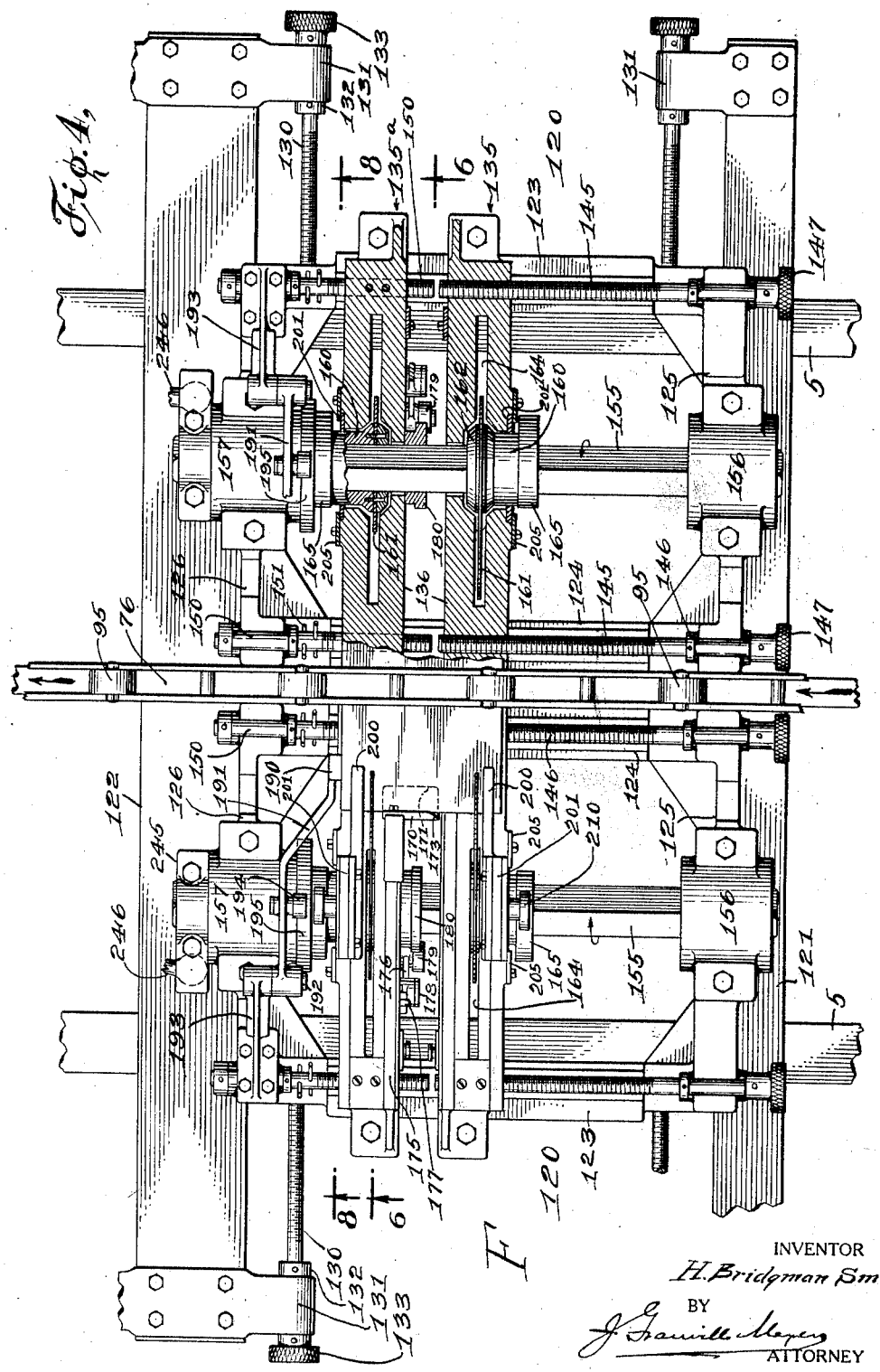

May 14, 1929. H. B. SMITH 1,712,971
MACHINE FOR SHAPING BOX BLANKS AND SIMILAR PURPOSES
Filed Oct. 26, 1925  8 Sheets-Sheet 5
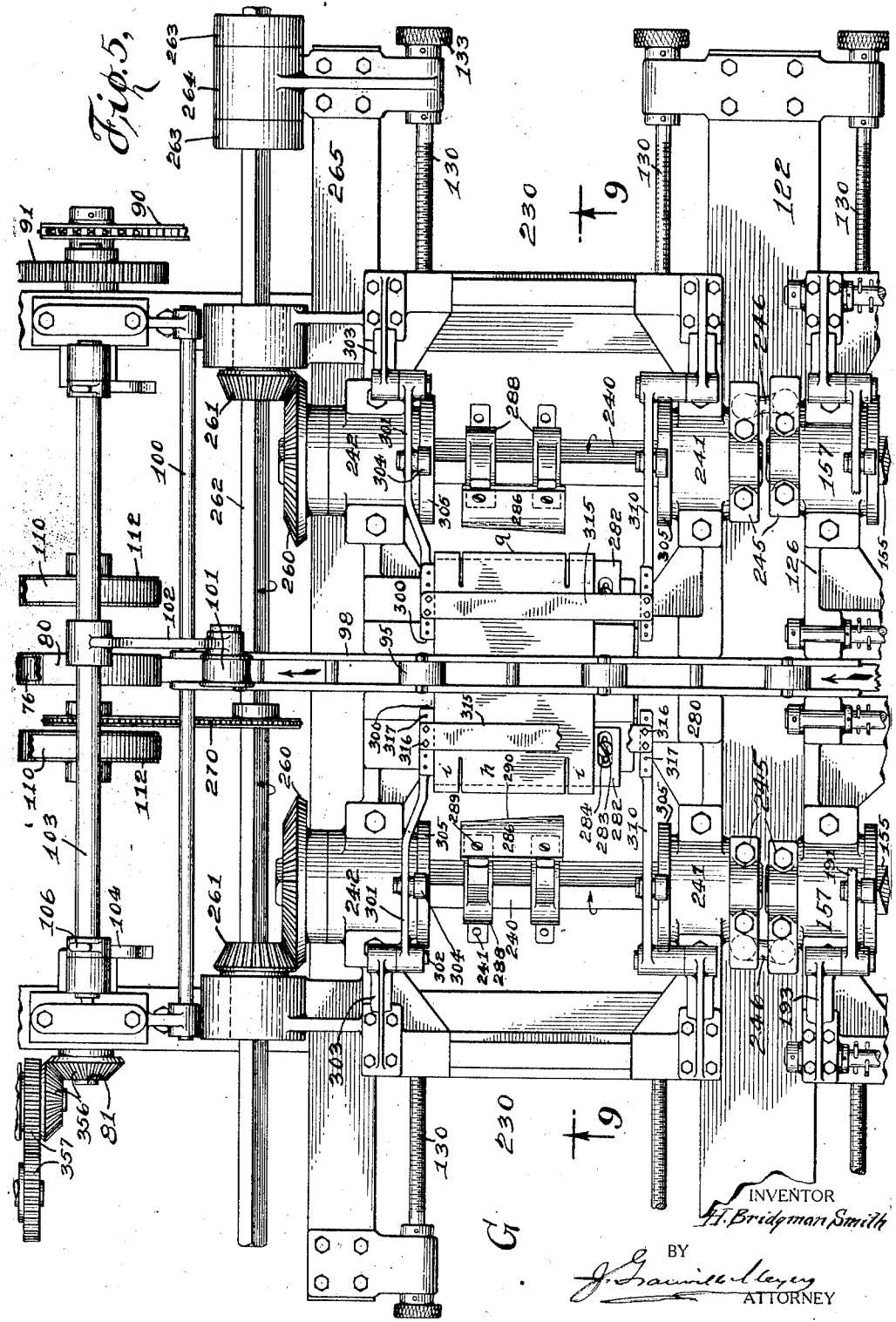
INVENTOR
H. Bridgman Smith
BY
ATTORNEY

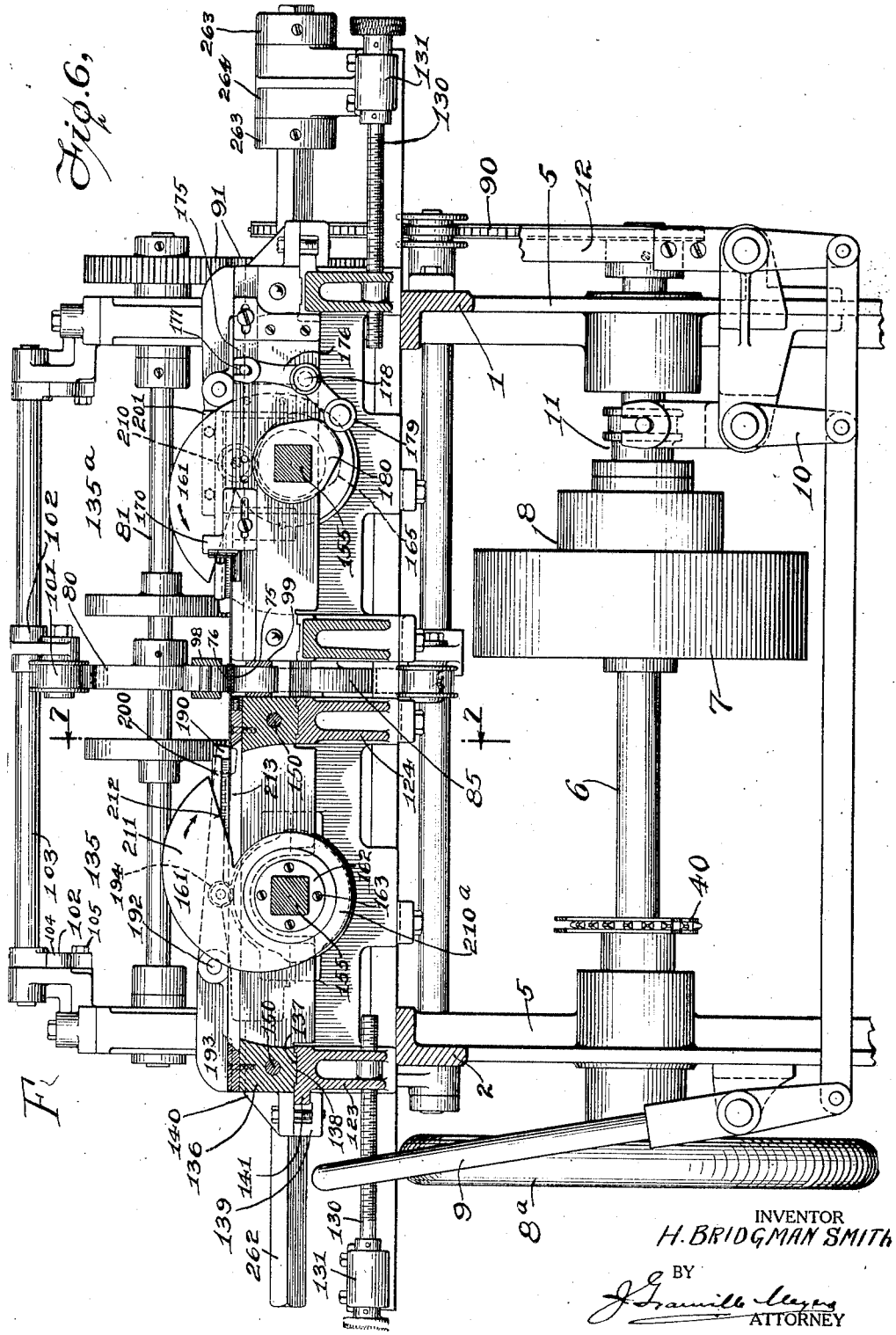

May 14, 1929.  H. B. SMITH  1,712,971
MACHINE FOR SHAPING BOX BLANKS AND SIMILAR PURPOSES
Filed Oct. 26, 1925  8 Sheets-Sheet 7
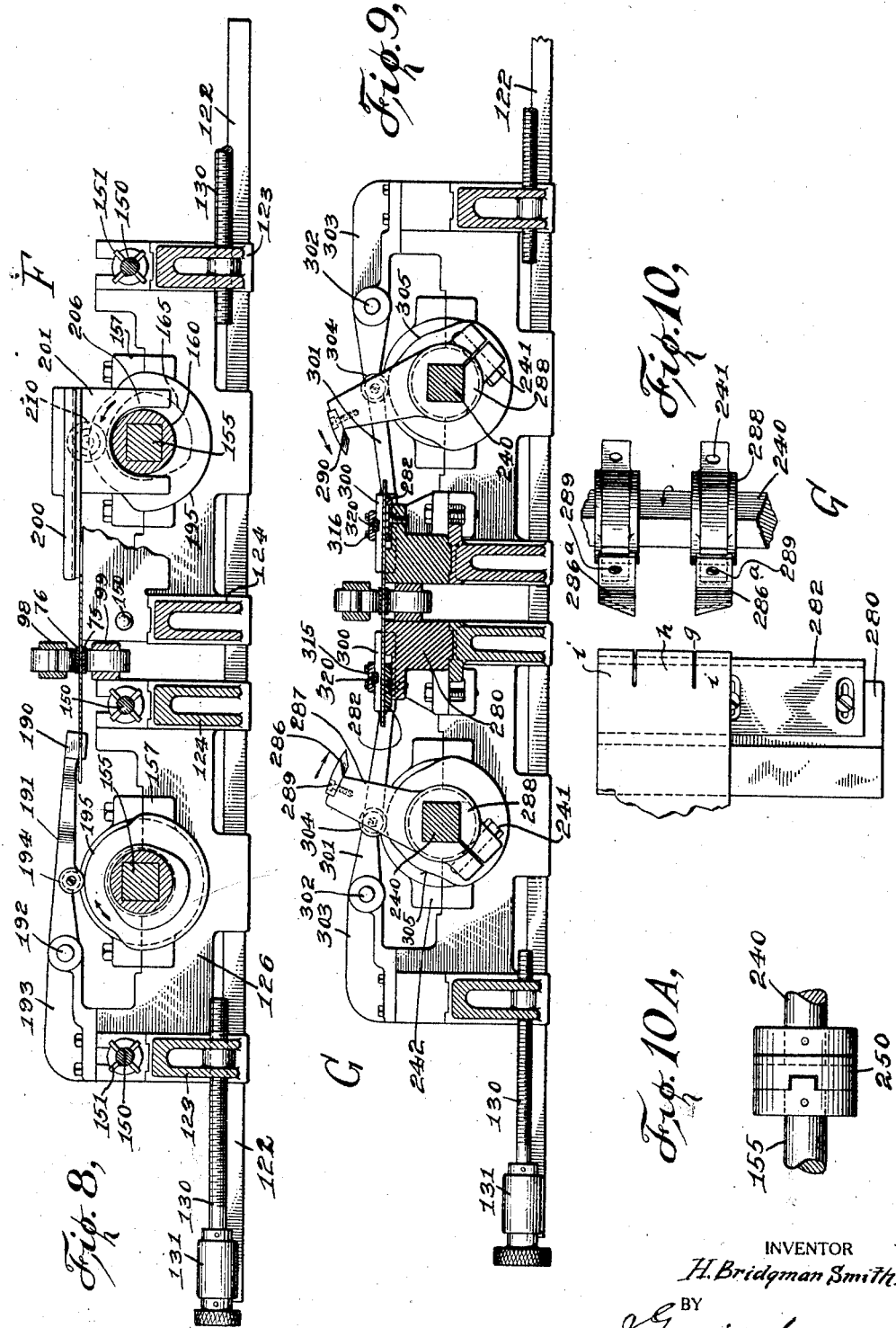
INVENTOR
H. Bridgman Smith.
BY
ATTORNEY May 14, 1929.　　　H. B. SMITH　　　1,712,971
MACHINE FOR SHAPING BOX BLANKS AND SIMILAR PURPOSES
Filed Oct. 26, 1925　　　8 Sheets-Sheet 8
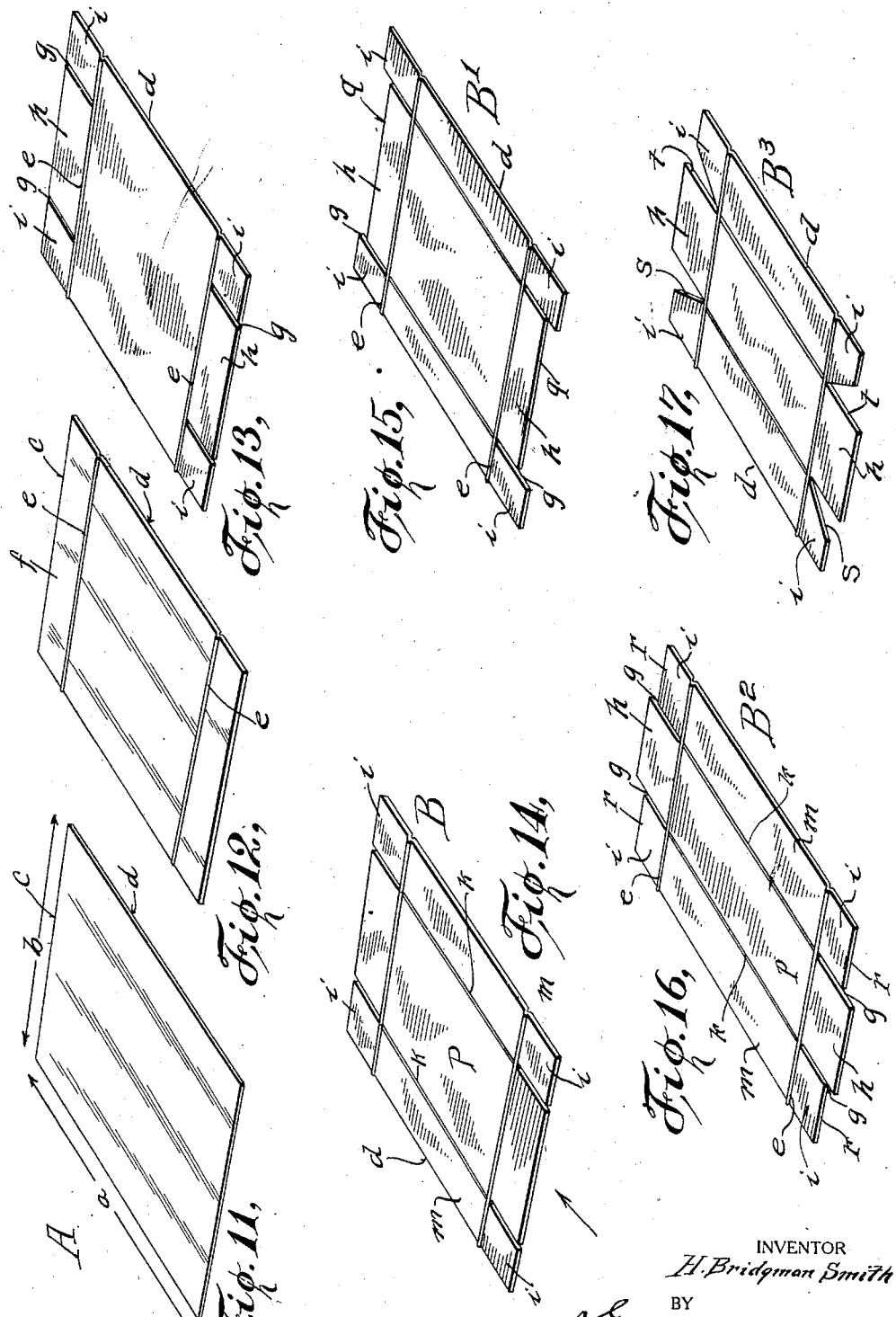

Patented May 14, 1929.

1,712,971

UNITED STATES PATENT OFFICE.

HARRY BRIDGMAN SMITH, OF NEW YORK, N. Y., ASSIGNOR, BY MESNE ASSIGNMENTS, TO HOAGUE-SPRAGUE CORPORATION, OF LYNN, MASSACHUSETTS, A CORPORATION OF MASSACHUSETTS.

MACHINE FOR SHAPING BOX BLANKS AND SIMILAR PURPOSES.

Application filed October 26, 1925. Serial No. 65,030.

My invention relates to a machine for shaping box blanks of cardboard and similar material, and which may also be used for other purposes where some or all of the conditions are similar.

In the representative embodiment here shown, the machine is arranged to handle box blank materials, such as cardboard, which is preferably supplied in the form of plain or rectangular individual blanks. When so supplied, these blanks are advanced singly and successively and are cut or slotted to provide for blank-wing separation, and are cut or trimmed to provide the desired blank shape or the desired dimensions of certain blank parts, such as wings or corner laps; at certain points or stages of progress of the blanks they are operated upon to provide fold lines or creases to facilitate subsequent folding, these creases usually running in two right-angled directions; all the stated operations are automatic, and the machine is capable of running at high speed to furnish a large output of finished blanks at low labor cost.

The mechanism is preferably made adjustable so that it operates upon the blanks with great precision, and when set for a particular size and shape of blank, it will turn out the completed blanks in substantially exact duplication of each other, so that the blanks are very well adapted for the operations of other automatic or semi-automatic machines in which they are set up or tabbed to form box shells, or are associated with cover paper and formed into completed covered box parts. In certain automatic machines, such, for example, as that disclosed in my Patent No. 1,479,401, January 1, 1924, it is important that accurately cut shell blanks be provided, and the present blank shaping machine is very well adapted for producing accurately cut or shaped blanks for use in such automatic box machines, as well as for many other purposes.

The characteristics and advantages of the invention are further sufficiently explained in connection with the following detail description of the accompanying drawings, which illustrate one exemplifying embodiment of the invention. In considering this embodiment, skilled persons will understand that many variations may be made in the construction and arrangement or organization of the machine as an entirety, or in subordinate parts or subcombinations of parts of the machine, and I therefore contemplate the employment of any structures that are properly within the scope of the appended claims.

Fig. 3 is a vertical longitudinal section in an approximately central plane, showing the slotting, wing cutting and certain of the crease forming parts of the mechanism.

Fig. 4 is a view, partly in plan and partly in horizontal section of the wing separating or slotting mechanism.

Fig. 5 is a plan view of the wing cutting or trimming mechanism.

Fig. 6 is a section at 6—6, Fig. 4.

Fig. 7 is a section at 7—7, Fig. 6.

Fig. 8 is a section at 8—8, Fig. 4.

Fig. 9 is a section at 9—9, Fig. 5.

Fig. 10 is a fragmentary detail, in plan, of the wing cutting or trimming elements in one particular arrangement.

Fig. 10$^a$ is a detail view of a modified drive connection.

Figs. 11 to 14 inclusive are perspective views of a box blank showing the successive operations performed upon it to produce a particular type or shape of blank.

Figs. 15 to 17 inclusive are perspective views illustrating different types or shapes of blanks which may be produced by different arrangements or modes of operation of the machine.

Figure 2:
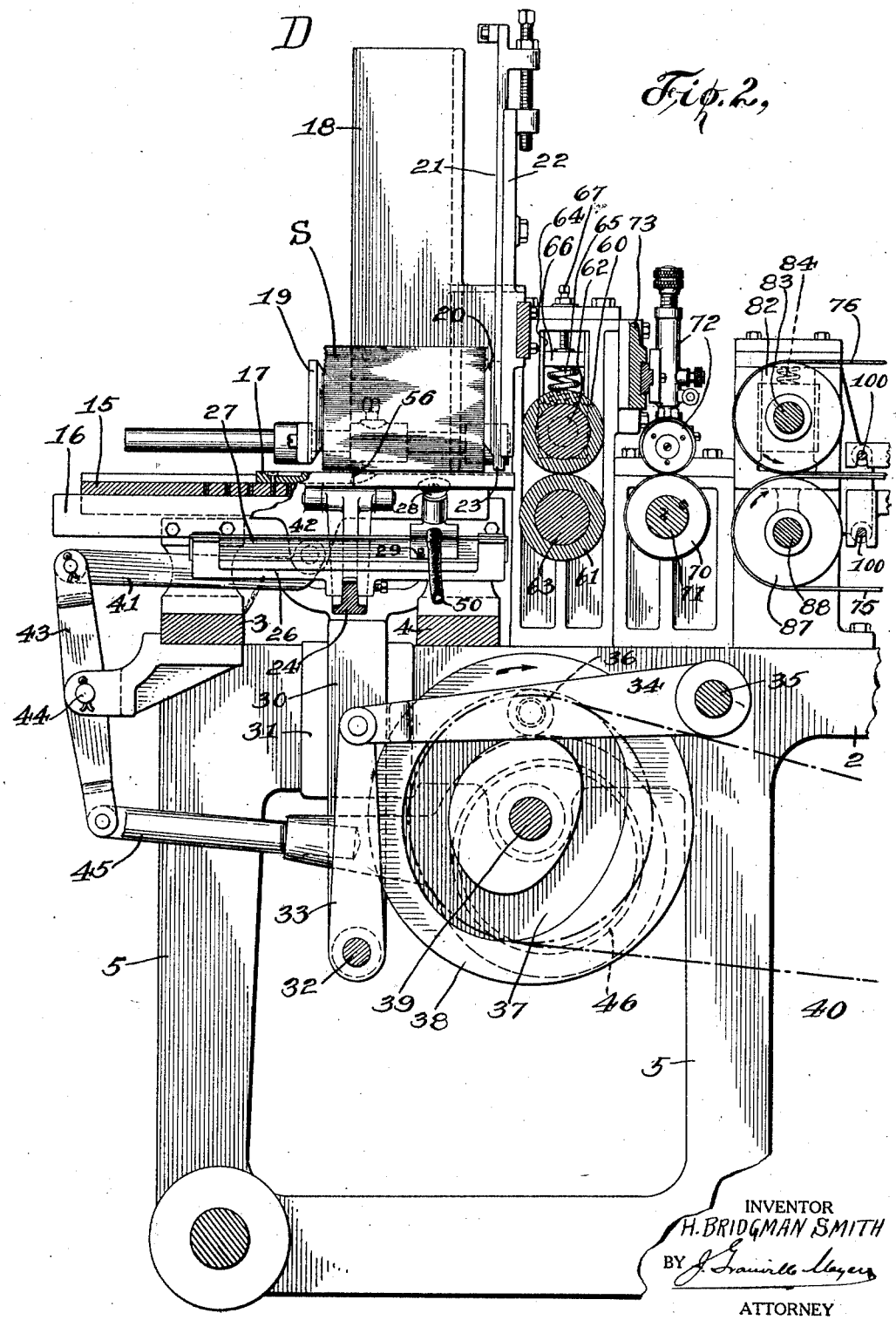
Fig. 2 is a vertical section in an approximately central longitudinal plane, enlarged, of the "front" or feed end of the machine.

In Fig. 11, A is a typical plain, rectangular blank of cardboard or similar material, of which the length $a$ and width $b$ may vary within a considerable range. While the material may in some cases be provided in roll form and advanced to initial feed members of the present blank shaping mechanism and cut off at a suitable point in the sheet progress to provide for blank separation, the machine in its present representative form is especially designed to handle material in the form of distinct blanks, such as A, Fig. 11, and these blanks are arranged in a stack S, Fig. 2, and are advanced singly by suitable separating and feeding mechanism to the initial feed rolls of the blank shaping mechanism proper. For a considerable range of relative blank dimensions, it is preferable to advance the blanks sidewise, that is, in a direction parallel to the end edges $c$; but evidently if the edges $d$ are shorter than the edges $c$, the blank will then appear to advance endwise instead of sidewise.

While the order of operations upon the blanks may vary in some cases, the general scheme of operations in the machine as here represented is such that in the progress of the blank, fold lines or creases $e$ are first produced; the end portions $f$ of the blank, that is, those portions outside the creases $e$ are then cut or slotted inward from the ends $c$ to provide for end wing and corner lap separation. The nature of these cuts or slots may vary considerably, but they are sufficiently represented in Fig. 13 by slots $g$ running from the ends $c$ and parallel to the sides $d$ to the fold creases $e$. These slots define or separate blank end wings $h$ and corner laps $i$. The cuts may sometimes be simple slits produced by cutting the material without excision of any of it, but preferably slots $g$ are produced by actually cutting away narrow strips of the material, this method of blank shaping providing for the easy and satisfactory folding of the blank end portions into proper box form.

In cases where the blank ends $c$ are originally of the proper outline, or to state a specific case, where the ends of the wings $h$ and the corner laps $i$ are in line with each other and the blanks as originally cut are of proper dimensions to produce the required wing and corner lap formation by the mere operation of slotting, the blanks may proceed directly or through an idle part of the mechanism to a point where they are provided with other score lines or creases $k$, the blanks being usually moved for this operation in a direction parallel to the side edges $d$ as indicated by the arrow, Fig. 14. The creases $k$ are usually in line with the slots $g$. The production of the fold lines or creases $k$ defines blank side wings $m$ in line with the corner laps $i$ and also completes the "definition" or outlining of the blank body or central portion. The completed blank B is then ejected from the machine.

In cases where the outer ends of the wings and corner laps $h$ and $i$ are not properly shaped or positioned after the slotting operation, the blanks are operated upon to produce the proper wing or lap formation. One particular example is shown in Fig. 15, wherein the end wings $h$ have been cut along the lines $q$ to produce the desired end wing dimensions, that is to say, to make the end wings shorter than the corner laps. Another example is shown in Fig. 16, in which the corner laps have been cut along the lines $r$ to make the corner laps shorter than the end wings. This operation is usually necessary or desirable in cases where the body portion $p$ of the blank $B^2$ is relatively narrow and the considerable length of the end wings $h$ in this particular example also corresponds to a box part which is quite deep in relation to its width. Fig. 17 is another particular example in which the inward edges $s$ of the corner laps are cut diagonally for a particular type of box. These corner lap formations may be produced by cutting at the same time that the outer ends of the end wings $h$ are shaped or trimmed, at a point or station subsequent to the slotting station or position. In brief, for the blank of Fig. 17 the slots $g$ may first be made to define the end wing edges $t$ and then at a subsequent or trimming station cuts may be made along the lines $s$ with the accompanying excision of triangular pieces of the material.

The plain blanks A, Fig. 11, will usually be furnished with at least two opposite edges correctly positioned or accurately cut, and by the operations of the present machine, the other two opposite edges may be accurately cut or trimmed at the machine station or position subsequent to the slotting position. This trimming or cutting may be for the purpose of accurately dimensioning the blank and not necessarily for the purpose of producing a particular end wing and corner lap formation. Specifically, in such a case as that of the blank B, Fig. 14, where the outer ends of the end wings and corner laps are all in line, these end edges at two ends of the blanks may be produced in accurate relation to each other by trimming at a point subsequent to the slotting station.

Other variations in blank form or dimensions will be sufficiently obvious to skilled persons without further detailed explanation.

Figure 1:
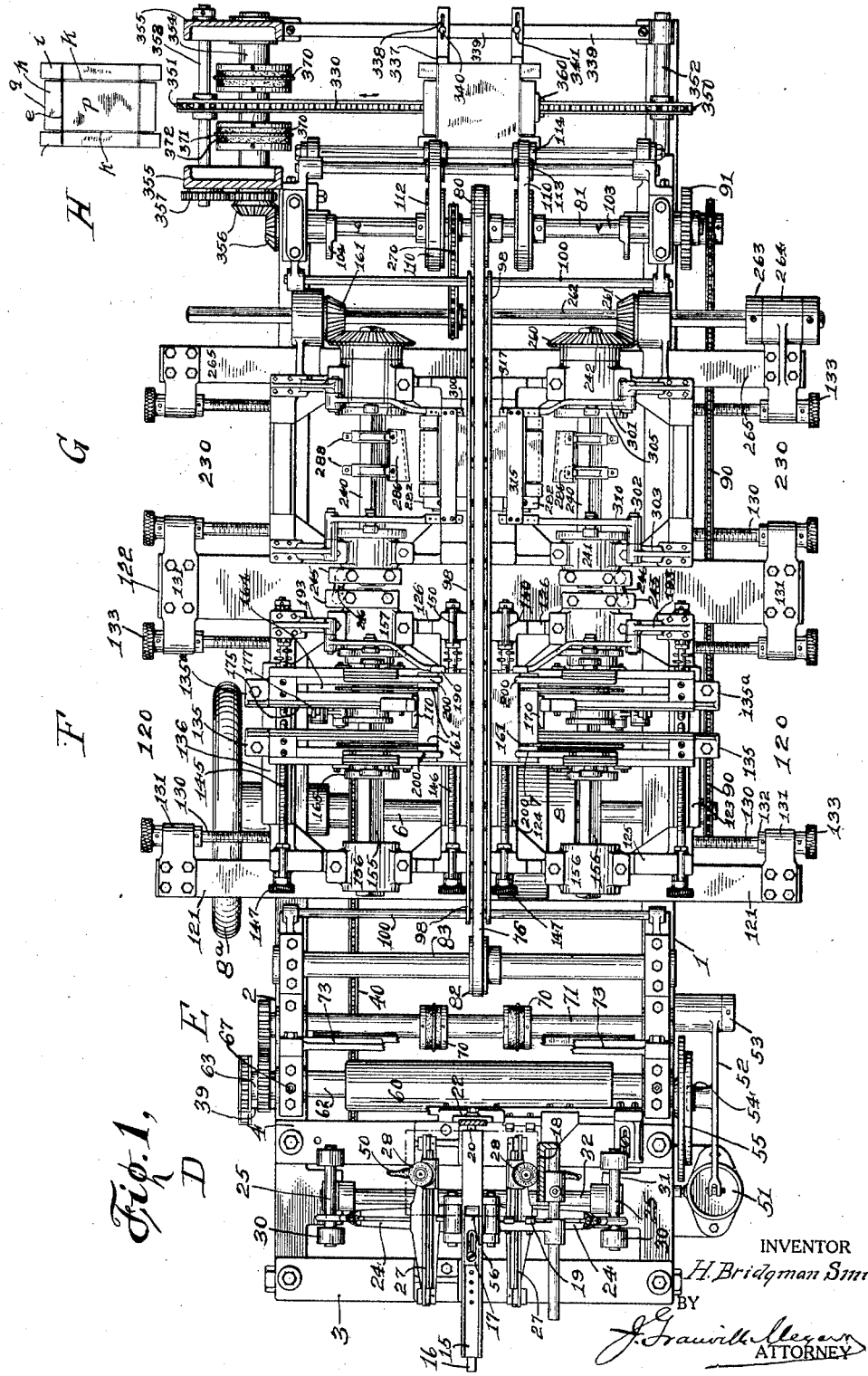
Fig. 1 is a plan view of a machine embodying the invention in one form.

The complete machine as shown in plan, Fig. 1, comprises co-ordinated groups of mechanism which may be described in a functional way as consisting of a blank separation and feed station D, a first creasing station E, a slotting station F, a trimming or cutting station G, and a second creasing station H.

The machine is built upon and around a frame which includes side members 1 and 2, connected by various cross members such as 3, 4, etc., and supported by legs or standards 5. A main drive shaft 6 is supported in bearings in standards 5 and is driven in any suitable way, for instance, by a pulley 7 from a counter shaft. Desirably, a clutch 8 is provided to connect and disconnect the pulley with the shaft and a lever 9 is arranged at a point convenient to the operation at one side of the machine and connected by suitable linkage 10 to clutch shifter 11. Another controlling lever 12 may be placed at the opposite side of the machine and also connected to the shifter by linkage 10. A large hand wheel 8$^a$ is desirably mounted on one end of shaft 6, to enable the machine to be "turned over" by hand while making adjustments.

The initial blank feed mechanism may be of any suitable type. The mechanism shown in the present embodiment (Figs. 1 and 2) is preferred in many cases since it provides for very accurate blank separation and feed, and also for top stack replenishment. This mechanism is of my invention, and of the type disclosed in Patent No. 1,665,937, Apr. 10, 1928, to which reference should be made for details of construction and operation not here included. The feed mechanism includes a carriage 15 arranged to reciprocate on a guide 16 and serving as a support for the blank stack S. Adjustably located on the carriage is a blank-edge engaging and feed member 17. The stack rests on the reciprocating carriage and is further supported and guided by vertical side members 18 and front and rear guide members 19 and 20, all of which may be adjusted for different blank dimensions. A stop plate or gate member 21 is arranged for vertical adjustment on a support 22, and the lower end 23 of this member is spaced slightly above the upper surface of carriage 15 and acts as a stop to permit advance of the lowest blank and to check any of the others. Arms 24 are hingedly connected to the carriage and their outer ends run on short guide rods 25. On each arm is a bracket 26 carrying a rail 27, and a suction head 28 is adjustably secured to each rail by a set screw 29. Each of the guide rods 25 is secured in the forked upper end of a bar 30, vertically movable in guides 31. The two bars 30 are connected by a shaft 32 and this shaft is centrally connected by a link 33 to a lever 34 fulcrumed at 35 and provided with a cam roller 36, engaging a cam track 37 in a cam body 38 secured on a shaft 39. This shaft is driven by sprockets and a chain 40 from primary drive shaft 6 above mentioned. Carriage 15 is moved to and fro by a link 41 connected to a dependent lug 42 on the carriage and to the upper end of a lever 43, which is fulcrumed at 44 and has its lower end connected by a link 45 to an eccentric 46 on shaft 39. Suction is applied at the proper times to the suction heads 28 by hose connections 50 leading to a suitable suction pump 51, Fig. 1, which is operated by a lever 52 fulcrumed at 53 and having a cam roller 54 engaging a track in a cam body 55 on one end of shaft 39.

When carriage 15 moves forward (to the left in Fig. 2) suction cups 28 are depressed. At about the time the carriage reaches the forward end of its stroke, the outer ends of bars 30 are raised by the action of cam track 37 bringing the suction cups in contact with the under surface of the lowest blank in the stack. Suction is applied, and as the carriage begins to move rearward (to the right, Fig. 2) the ends of the blank, at each side of the supporting carriage, are pulled down, and the blank is curved in the transverse plane of the machine to free its end portions from the stack. The left-hand edge of the blank is at the same time engaged by a shoulder 56 at the end of feed member 17, and the blank is advanced with the carriage beneath the end 23 of stop plate 21. After the blank is advanced slightly beyond the stop, suction is cut off, or in other words, normal air pressure is applied to cups 28; the ends of the blank are released, and the blank is free to straighten out as its advancing edge comes between upper and lower primary feed rolls 60 and 61.

These rolls are carried by shafts 62 and 63, of which the upper shaft is mounted in bearing blocks arranged for vertical movement in frame guides 64, and springs 65 are provided, adjustable by means of blocks 66 and screws 67, to urge the upper roll yieldingly against the lower one. The roll shafts are driven by suitable chain or gear connections to shaft 39. As the blank is gripped by the feed rolls, the carriage returns to forward position.

The described blank feed mechanism is very positive in its action, and skips in the feed are very infrequent and in fact, practically nonexistent, whether the blanks are flat or buckled when placed in the stack holder. While the described feed arrangement is desirable and preferred in many cases, other suitable feed mechanism may be employed.

Adjacent to the primary feed rolls means are provided at the position or station E for producing the fold lines e, Fig. 12. In the broader aspect of the invention this fold line producing mechanism may be of any known or suitable character, and the fold lines may be in the form of scores; but preferably a particular kind of fold line is produced, namely, what I call a bead or crimped crease; and suitable mechanism is provided for that purpose. This mechanism is of a known type and comprises lower creasing rolls 70 carried by a shaft 71 and adjustable longitudinally thereon laterally in respect to the center line of blank travel to properly position the creases. Upper creasing instrumentalities 72 are provided to co-operate with the lower rolls, these upper devices being mounted for lateral adjustment on a cross bar 73. Since this creasing mechanism is substantially identical with other creasing mechanism employed for subsequently forming the other creases $k$, and such mechanism is more fully illustrated, the construction and arrangement of these creasing mechanisms will be further sufficiently described hereafter. Shaft 71 of creasing rolls 70 may be driven by a gear or chain connection to shaft 63 or directly to shaft 39.

As the successive blanks leave the creasing mechanism 70—72, they are grasped by a conveyor which carries them past stations F and G to a point where they are to be moved transversely to station H. This conveyor comprises lower and upper belts 75 and 76, the lower stretch of belt 75 and the upper stretch of belt 76 being arranged to travel in contact, except as they frictionally grip the blanks between them. Belt 76 passes about a rear pulley 80 on a shaft 81, and a front idler pulley 82 on a shaft 83. This shaft is carried in vertically movable bearing blocks pressed downward by springs 84. Belt 75 passes over a rear pulley 85 on a shaft 86 and a front idler pulley 87 on a shaft 88. Pulley shaft 86 is driven by sprockets and a chain 90 from main drive shaft 6, and upper pulley shaft 81 is driven by gears 91 from shaft 86.

The adjacent stretches of the two belts are guided, supported and held in proper contact by a series of upper and lower pulleys 95 and 96 carried by short shafts 97, which rest in bearing notches in upper and lower parallel longitudinal pulley-frame bars 98 and 99 respectively, the ends of these bars being supported on cross rods 100 located in suitable upright frame side members. When necessary or desirable, as in the case of especially long blanks (in the transverse direction of the machine) outer portions of the blanks may be supported and guided by longitudinal stationary rails (not shown). To properly tighten or tension the belts, jockey pulleys 101 are provided, carried by arms 102 mounted on cross rods 103, these rods being mounted for oscillation in suitable frame bearings and being provided with slotted sectors 104 so that the jockey pulleys can be clamped in adjusted position by nuts 105. Handles 106 are also provided on the cross rods to facilitate the manipulation of the pulley arms.

As the blanks pass out from between the adjacent stretches of belts 75 and 76 at the rear end of the conveyor, they are desirably further advanced by another short system of conveyor belts consisting of two parallel upper belts 110 and corresponding lower belts 111. The upper belts pass around main driving pulleys 112 on shaft 81 and idler pulleys 113 and 114 of which the lower pulleys 114 are adjustable in slots 115 to properly tension or tighten the belts. The lower belts 111 are similarly supported, guided and adjusted. The described secondary or supplemental conveyors consisting of the belts 110 and 111 advance the blanks and position them over a transverse chain conveyor, as more fully described hereafter.

The blanks leaving the creasing station E pass between the adjacent stretches of conveyor belts 75 and 76 and by them is carried to station F, at which is located mechanism for producing the blank cuts or slots $g$, Fig. 13. At this station two main slotter frames 120 are mounted for lateral adjustment, toward and from the blank conveyor, on transverse frame bars 121 and 122. Each frame is substantially rectangular and includes longitudinal members 123 and 124 and transverse members 125 and 126, the transverse members being provided near their lower edges with ways 127 arranged to run on margins of bars 121 and 122 and being also provided with detachable flanges 128 engaging under the bars to prevent upward displacement of the frames. The frames are easily and accurately adjusted by screws 130 engaging in frame members 123 and passing through suitable bearings in lugs 131 secured to bars 121 and 122 respectively, the screws being provided with collars 132 to prevent end motion and with knurled knobs 133 for their convenient manipulation. While the slotter frames will usually be adjusted simultaneously toward and from the center line, and for that purpose the axially alined screws 130 might be continuous, with right and left threads to simultaneously adjusting the frames, it may be in some cases necessary to adjust one frame more or less without movement of the other and for that reason the axially alined screws may be made independent as here shown.

On each of the slotter frames or carriages 120 are two individual slotter units 135 and 135$^a$, each of which comprises a frame or base member 136, these members having at their ends suitably formed ribs 137 engaging in channels 138 on the top faces of frame bars 123 and 124, to permit adjustment of the slotter units longitudinally of the machine; and the frame members 136 are held down on the main slotter frames by flanges 139 detachably secured to lugs 140 and engaging under flanges 141 formed on main frame longitudinal members 123. The slotter units 135 are adjusted by screws 145 having threaded engagement in the frame members 136 and also passing through half bearings in the main frames 120 and provided with collars 146 to prevent movement and also with knurled knobs 147 for convenient manipulation. Different blank slot locations may in some cases be provided for by adjusting only the units 135; but it is desirable also in some cases, to adjust the units 135$^a$, and for that purpose substantially similar screws 150 are provided, these screws being provided with cross pins 151 for their adjustment manipulation.

A longitudinal drive shaft 155 passes with suitable clearance through both of the frame or body members 136 on each main slotter frame 120, and is supported in bearings 156 and 157 on frame cross members 125 and 126 respectively. Between the bearings the shaft is of polygonal cross section, or otherwise it may be splined, to fit and drive certain parts, including cams and slotter hubs which are designed for longitudinal movement on the shaft.

The shafts 155 are driven by any suitable couplings from similar shafts of blank-end cutting or trimming mechanisms hereafter described, and certain suitable couplings or driving connections between the respective shafts will also be explained hereafter.

For each of the units 135 and 135ª a slotter hub 160 is slidably located on shaft 155 and a cutter or slotter blade or disc 161 is detachably secured to the hub by a collar 162 and screws 163. The cutter discs are accommodated in openings 164 in the bars or frame members 136. Each hub 160 is also provided with a blank-clamp-operating cam 165.

It is desirable to properly locate the blank laterally of the machine as or just after it comes into slotting position. For this purpose vertical blank-end gage members 170 are provided, which may also have inwardly projecting lower flanges 171 to engage under and aid in supporting the adjacent blank end or to guide it to proper positions over the fixed cutter blades. The front edge of each of the gauge or guide members 170 and 171 is rounded off as at 173 to properly receive and direct the advancing blank edge or corner. While the location and mode of operation of these blank gauge or adjusting members may vary, conveniently they are arranged as parts of one of the slotter units of each frame 120. Specifically, these gauge members are carried by slides or bars 175 suitably secured for reciprocation on frame members 136 of the units 135ª. The slides are operated by bellcrank levers 176, forked at their upper ends to engage pins 177 on the slides, fulcrumed at 178 on the frame members 136, and provided at their lower ends with cam rollers 179 engaging cams 180 mounted on the corresponding shafts 155; and conveniently these cams may be secured rotatively with the corresponding slotter hubs 160 or the fastening flanges 162 thereof.

Stops are provided to bring the successive blanks to rest in the proper slotting position in respect to the longitudinal direction of the machine. These stops are conveniently identified as feed stops, and they may be variously located and operated.

In the present specific embodiment the feed stops 190 are formed on the ends of arms 191 and have vertical faces to engage the advancing side edge of the blank and stop it in the proper position, as shown in Fig. 4, while the conveyor belts slide on the upper and lower surfaces of the blank during the slotting action. Arms 191 are fulcrumed at 192 in lugs 193 secured to frame members 124, and are provided with cam rollers 194 engaging cams 195 fixed on the respective shafts 155, and these cams may be secured against end movement, since in the present arrangement the stops 190 are not adjustable longitudinally of the machine. It will now be apparent that one object of the adjusting of the slotter units 135ª is to properly position their slotters in relation to the stops 190 when the latter are in longitudinally-fixed positions.

It is desirable, although probably not necessary in all cases, to provide clamps to hold the blanks with considerable firmness in position for slotting after they have been located by the stops 190 and guides or gauge members 170. For this purpose clamping members or fingers 200 are arranged substantially as arms extending from vertically movable plates 201 and adjustable thereon toward and from the machine center line. The plates are freed for vertical movement on the slotter unit frame members 136 by vertical guides 205. The lower portions of the plates are cut out as at 206 to accommodate shafts 155 or adjacent slotter hubs 160. Each plate has a cam roller 210 to cooperate with one of the cams 165 previously mentioned.

Shafts 155 rotate once in each machine cycle. As a blank advances between the conveyor belts toward the position of Fig. 4, gauges 170 are retracted laterally, clamps 200 are raised and stops 190 are located in front of the advancing blank side edge. This blank edge and adjacent corners pass between the gauges 170 being aided in the proper movement if the blank is somewhat dislocated, by the beveled or rounded gauge edges 173, and the advancing edge of the blank is similarly guided or directed over the supporting flanges 171. The advancing blank edge then encounters stops 190, which properly straighten the blank and stop it in correct cutting position. Gauges 170 are then moved simultaneously toward the center of the machine and adjust or "center" the blank in the lateral direction of the machine. Clamps 200 are then dropped upon the blank and hold it with sufficient firmness for cutting. If necessary, springs may be provided, to hold the clamps in contact with the blank. After the cutting or slotting operation gauges 170 are retracted laterally, clamps 200 are raised and stops 190 are raised clear of the blank, which then advances with the conveyor belts below the stops to the next position or station G.

The cutters or slotters 161 may vary considerably. In the present embodiment they are relatively thin plates or discs, each of which includes a substantially semi-circular portion 210ª and an enlarged portion or lobe 211, formed with a cutting edge 212 so arranged that as it approaches the blank it will make a shearing cut against the fixed cutting edges 213 formed as parts of cutter bars 214 properly seated in frame members 136 at opposite sides of the upper portions of openings 164. While in some cases the cutter may make simply a slit or cut in the blank to effect wing and corner lap separation, preferably the blade is of sufficient thickness to excise a narrow strip of the blank material and form a definite slot rather than merely a cut.

The end cutting or trimming mechanism at station G comprises cutter frames 230 substantially similar to the main slotter frames 120 and adjustable laterally of the machine in a similar way and these details are therefore not particularly described. A drive shaft 240 passes longitudinally through each frame and is supported in bearings 241 and 242 therein, these shafts being usually approximately in line with shafts 155 before mentioned. Since it is convenient to drive shafts 155 from the adjacent shafts 240, and since the respective frames 120 and 230 are sometimes adjusted so that the respective shafts are not directly in line, provision is made for properly driving shafts 155 regardless of such moderate disalignment. One such arrangement is shown in Figs. 1, 3, 4 and 5, consisting of driving heads 245 clamped on the ends of the respective shafts and connected by a short driving pin 246 which has ball ends fitting in sockets in the driving heads, thus providing a coupling which permits moderate disalignment. Otherwise the shafts may be connected by an Oldham coupling 250, Fig. 10ª.

Shafts 240 are driven by bevel gears 260 and pinions 261 from a transverse shaft 262. The shaft is squared or the pinions are otherwise secured to rotate with it while they may slide longitudinally of the shaft to permit adjustment of the frames 230. The shaft is also fixed against longitudinal movement by means of collars 263 engaging at opposite sides of a bearing 264 secured to a fixed frame cross bar 265. Shaft 262 is driven from transverse pulley shaft 86 previously mentioned by sprockets and a chain 270.

Portions of the top surface of inner longitudinal members 280 of frames 230 are arranged as blank supports (Fig. 9) and adjacent to these blank supporting surfaces fixed cutter blades 282 are supported for adjustment transversely of the machine by screws 283 engaging in blade slots 284 and arranged to clamp the blades in adjusted position on the frame members 280. To co-operate with the fixed cutter blades, moving blades 286 are secured to the outer ends of arms 287 which have split hubs 288 engaging about the squared shafts 240 and provided with screws 241 to clamp the arms in the proper longitudinal positions upon the shafts. Desirably the blades 286 are detachably secured to the arms, as by screws 289. The described arrangement is such that with movable blade supporting arms 287 of definite length the fixed blades 282 may be accurately adjusted for cutting co-operation with the movable blades, and the frames 230 may then be adjusted laterally of the machine to bring the cutting line in proper relation to the blank end. The cutting edges 290 of the movable blades are angularly arranged to make a shearing cut.

After the slotter frames 123 have been adjusted to make slots of proper length in the blanks at station F, the frames 230 may then be adjusted to bring the end shaping or trimming cuts at station G to the proper points on the blank ends or end portions, this reasonable variation in the positioning of the respective frames being permitted by the flexible coupling 246 or equivalent arrangement, as above explained. For greater variations in the position of the trimming cuts at station G, the blade arms 287 may be of different lengths and the fixed blades 282 may be correspondingly adjusted.

The movable cutters 286 may be arranged to trim or shape only the blank end wings $h$, as shown in Fig. 5, or cutters 286ª may be provided and arranged as shown in Fig. 10 to shape or trim only the corner lap $i$; or an end wing cutter and corner lap cutters may be provided if desired to trim or shape the end wings and corner laps simultaneously; or if it is desired to trim the entire end of the blank to the same length, a single long moving cutter blade 286 may be provided for this purpose. Other cutter structures or arrangements will be understood without elaborate explanation. For instance, the fixed and movable cutter blades may be arranged in an obvious way to cut the corner laps on the diagonal lines S, Fig. 17, to produce the particular corner laps there shown.

Lateral blank gauges or adjusters similar to the members 170 as above explained, in connection with the slotting mechanism, may be provided at station G. Since this mechanism may be substantially similar to that already explained, a showing of it in connection with station G is omitted.

Stops 300 are provided to check the blanks in cutting or trimming position, these being similar to the stops 190 at the slotting station, and similarly operated. Particularly, the stops 300, which may be designated as blank feed stops, are formed on the ends of arms 301, pivotally mounted at 302 on frame brackets 303, and provided with cam rollers 304 running on the peripheries of cams 305 which are connected to shafts 240, or to the hubs of gears 260, which may be extended through the bearings 242. Near the forward ends of frames 230 other arms 310 are provided, similar to arms 301, except that the stops 300 are omitted. Arms 310 are similarly mounted and cam operated, or in some cases the definite actuation of arms 310 may be omitted and they may be operated merely by connection with arms 301. This connection consists of longitudinal bars 315 adjustably connected to the respective arms by screws 316 engaging series of correspondingly positions screw holes 317 in the arms, so that the bars may be adjusted laterally of the machine. The under surfaces of these bars constitute blank clamping members or they may be provided with clamping strips 320 of felt, rubber or other suitable blank-clamping material to hold the blank securely in trimming position on the upper surfaces of frame members 280.

When the blanks advance toward the position of Fig. 5, arms 301 and 310 with their connecting clamping bars 315 are slightly elevated, sufficient to hold the clamping bars or their clamping members 320 above the blank level, arms 301 being, however, positioned to present the vertical faces of stops 300 in front of the advancing blank side edge. The cutters 286 in whatever arrangement may be provided are advancing rotatively toward the fixed blades 282. The blank now encounters the stops and is held and straightened by them, and may be also laterally positioned by gauges similar to the gauges 170 previously mentioned, which may be provided at this station if desired; the cutters then act to trim the blank in any of the indicated ways and pass on clear of the blank; arms 301 and 310 are elevated by the cam mechanism sufficiently to free the blanks from the clamping bars and to elevate the stops 300 above the blank; the blank thereupon is advanced by the feed belts and is brought between the parallel supplemental conveyor belts 110 and 111, and is by them carried to a position over the transverse conveyor chain 330, Figs. 1, 3 and 5.

As the blank passes over the upper stretch of the chain it is located upon a shelf 335 having a depressed forward edge 336, and against vertical stops 337 adjustably supported by arms 338, which are secured to a frame cross member 339 by screws 340 passing through arm slots 341. Conveyor chain 330 is supported by sprockets 350 and 351 on shafts 352 and 353 respectively. Adjacent to shaft 353 is a roll shaft 354 mounted in bearings in frame members 355. This shaft is driven by bevel gears 356 from shaft 81, and in turn drives conveyor shaft 353 by spur gears 357. The conveyor chain has suitably spaced blank pushers 360 and as the blank is positioned as shown in Fig. 1, a pusher advances and engages the end of a blank end wing and advances the blank to fold line or crease forming mechanism H which produces the fold lines or creases $k$.

The construction or arrangement of this fold line producing mechanism may vary as pointed out in connection with the mechanism at station E. In the present embodiment of the invention, this mechanism is of a known type for producing bead or crimp creases. For this purpose creaser rolls 370 are secured in longitudinally adjustable positions on shaft 354. These rolls have a center blade or flange 371 at each side of which is arranged an annulus of compressible or resilient material 372. Upper creasing rolls 375 cooperate with each lower roll, the upper rolls being angularly supported on heads 376 arranged for vertical adjustment by means of nuts 377 and also supported on carriers 378, which are arranged for adjustment laterally in respect to the blank in a horizontal guide way 379. As the blank is advanced on chain 330 by one of the pushers 360, it passes between the lower and upper creasing rolls, which produce the crimp or bead creases $k$, and the completed blank is then ejected.

The machine, therefore, in its preferred form includes completely automatic mechanism for operating upon plain blanks of considerably varying dimensions to produce thereupon the desired fold lines or creases, wing separations and end formations, with a full range of adjustment in respect to all of these items, the adjustment range being limited in fact only by reasonable conditions of machine design or reasonable requirements for variations in blank formations or dimensions. The construction and arrangement is moreover such that the operations are very accurately performed, resulting in a very uniform and exactly finished product without sacrifice of speed or economy for the sake of accuracy, and in fact with very greatly increased output capacity and lowered labor cost in comparison with previously existing mechanisms and methods.

What I claim is:

1. A machine of the class described, comprising means for advancing box blanks of fibrous sheet material, means for producing fold lines thereon, means for slitting the material inward from opposite margins to produce foldably divided end wings and corner laps, and means for trimming off end portions of sundry of the said wings and corner laps to change the relative extension thereof.

2. A machine of the class described, comprising means for advancing rectangular box blanks of cardboard or analogous sheet material, means for producing longitudinal and transverse fold lines thereon of which two parallel lines define the inward ends of integral blank end flaps, means for slitting the blank inward from opposite end edges to provide flap separation, means for trimming certain flaps diagonally adjacent their longitudinal edges, and means for cutting off ends of certain flaps to properly regulate relative flap length.

3. A machine of the class described, comprising means for advancing blank material, means for cutting the material inward from opposite edges to provide for blank wing and corner lap separation, means for trimming opposite margins of the material to change the relative extension of end wings and corner laps and means operating during the advance of the material in relation to said cutting and trimming means to produce parallel fold lines therein.

4. A machine of the class described, comprising means for advancing fibrous sheet material, means for cutting the material inward from opposite side edges to provide for blank end wing and corner lap separation, means for trimming or cutting away portions of opposite margins of the material to change the relative extension of the end wings and corner laps, and means operating during the advance of the material in relation to said cutting and trimming means to produce parallel fold lines therein, certain of the fold lines being located divergently from others.

5. A machine of the class described, comprising means for advancing fibrous sheet box forming material, means for positioning the material accurately at one or more operating stations, means at one of the stations for cutting the material inward from opposite edges to effect blank wing or lap separation, means at another station for cutting off portions of the material adjacent opposite edges or margins thereof, means for moving the material in a direction substantially at a right angle to the first named movement, and means acting upon the material during its advance movements to produce thereon parallel fold lines running in different directions.

6. A machine of the class described, comprising means for advancing sheet material, means for positioning the material accurately at one or more operating stations, means at one of the stations for producing substantially transverse cuts in opposite margins of the material to effect blank wing and corner lap separation, trimming means at another of said stations for changing the relative extension of the corner laps and the wings upon which they are adapted to lap and rotary creasers acting upon the material during its advance to produce parallel fold lines therein.

7. A machine of the class described, comprising means for advancing fibrous sheet material, means for positioning the material accurately at one or more operating stations, means at one of the stations for producing substantially transverse cuts in opposite margins of the material to effect blank wing or lap separation, means at another of said stations for cutting off portions of the material at opposite margins thereof, means for moving the material in a direction substantially at a right angle to the first named movement, and means acting upon the material during its advance movements to produce thereon parallel fold lines running in different directions.

8. A machine of the class described, comprising means for advancing fibrous sheet box forming material, means for positioning the material accurately at one or more operating stations, means at one of the stations for producing substantially transverse cuts in parallel margins of the material to effect blank wing or lap separation, means for moving the material in a direction substantially at a right angle to the first named movement, and means acting upon the material during its advance movement to produce parallel fold lines running in different directions thereon.

9. A machine of the class described, comprising means for advancing fibrous sheet box forming material, means for positioning the material accurately at one or more operating stations, means at one of the stations for producing substantially transverse slots in parallel margins of the material to effect blank wing or lap separation, means at another of said stations for trimming the material adjacent opposite margins thereof, means for moving the material in a direction substantially at a right angle to the first named movement, and means acting upon the material during its advance movement to produce thereon parallel fold creases running at right angles to each other.

10. A blank shaping or forming machine, comprising means for advancing successive blanks of sheet material, means for producing parallel fold lines on the successive blanks, means for positioning the successive blanks at an operating station, means thereat for cutting the blanks in opposite margins, means for moving the blanks away from the last named operating station, and means acting upon the blanks during a part of the last named movement to produce parallel fold lines or in directions divergent from the first named lines.

11. A blank shaping or forming machine, comprising means for advancing successive blanks of sheet material, means for producing parallel fold lines on the successive blanks, means for positioning the blanks at an operating station, means at said station for cutting the blanks at opposite margins, means for positioning the blanks at another operating station, means at said station for trimming the blanks adjacent opposite edges thereof, means for moving the blanks away from the last named station, and means acting upon the blanks during a part of their advance by said last named means to produce parallel fold lines in a direction at a right angle to the first named lines.

12. A box blank shaping or forming machine, comprising means for advancing successive individual box blanks of fibrous sheet material such as cardboard, means for producing parallel fold creases on the successive blanks, means for stopping, positioning and holding the successive blanks at an operating station, means at said station for slotting the blanks inward from opposite edges, means for moving the blanks away from the last named operating station, and means acting upon the blanks during the last named movement to produce parallel fold creases at a right angle to the first named creases.

13. A box blank shaping or forming machine, comprising means for advancing successive plain, rectangular box blanks of fibrous sheet material such as cardboard, means for producing parallel longitudinal fold creases on the successive blanks, means for stopping, positioning and holding the successive blanks at an operating station, means at said station for slotting the blanks laterally in respect to their direction of movement, means for stopping, accurately positioning and holding the blanks at another operation station, means at said station for trimming the blanks adjacent to their longitudinal edges, and means for moving the blanks away from the last named station.

14. A box blank shaping or forming machine, comprising means for advancing successive plain, rectangular box blanks of fibrous sheet material such as cardboard, means for producing parallel longitudinal fold creases on the successive blanks, means for stopping, positioning and holding the successive blanks at an operating station, means at said station for slotting the blanks laterally in respect to their direction of movement, means for stopping, accurately positioning and holding the blanks at another operation station, means at said station for trimming the blanks adjacent to their longitudinal edges, means for moving the blanks away from the last named station, and means acting upon the blanks during the last named movement to produce parallel fold creases at right angles to the first named creases.

15. A box blank shaping or forming machine, comprising means for advancing successive plain, rectangular box blanks of fibrous sheet material such as cardboard, means for producing parallel longitudinal fold creases on the successive blanks, means for stopping, positioning and holding the successive blanks at an operating station, means at said station for slotting the blanks laterally in respect to their direction of movement, means for stopping, accurately positioning and holding the blanks at another operating station, means at said station for trimming the blanks adjacent to their longitudinal edges, means for moving the blanks away from the last named station and for advancing the blanks in a direction divergent from the first named directions, and means acting upon the blanks during said divergent advance movement to produce parallel fold creases upon the blanks in directions divergent the first named creases.

16. A box blank shaping or forming machine, comprising means for advancing successive plain, rectangular box blanks of fibrous sheet material such as cardboard, means for producing parallel longitudinal fold creases on the successive blanks, means for stopping, positioning and holding the successive blanks at an operating station, means at said station for slotting the blanks laterally in respect to their direction of movement, means for stopping, accurately positioning and holding the blanks at another operating station, means at said station for trimming the blanks adjacent to their longitudinal edges, means for moving the blanks away from the last named station, means for advancing the blanks at a right angle to the first named advance, and means acting upon the blanks during the last advance movement to produce parallel fold creases at right angles to the first named creases.

17. A box blank forming or shaping machine, comprising means for feeding individual box blanks, conveying means arranged to frictionally engage and advance the blanks, means for producing longitudinal fold creases in the blanks during their movement, work stations, means at each station for stopping and positioning the successive blanks for operations to be performed thereon and for withdrawing said stopping means to permit further blank movement after the operation at said station, and means at one of the working stations for cutting the blanks inwardly from opposite longitudinal edges to provide for wing or lap separation.

18. A box blank forming or shaping machine, comprising means for feeding individual box blanks, conveying means arranged to frictionally engage and advance the blanks, means for producing longitudinal fold creases in the blanks during their movement, work stations, means at each station for stopping and positioning the successive blanks for operations to be performed thereon and for withdrawing said stopping means to permit further blank movement after the operation at said station, means at one of the working stations for cutting the blanks inwardly from opposite longitudinal edges to provide for wing or lap separation, and means for producing additional fold lines on the blanks at right angles to the fold lines first mentioned.

19. A box blank forming or shaping machine, comprising means for feeding individual box blanks, blank conveying means, means for producing longitudinal fold lines in the blanks, work stations, means at each station for stopping and positioning the successive blanks for operations to be performed thereon and for withdrawing said stopping means to permit further blank movement after the operation at said station, means at one of the work stations for slotting the blanks inwardly from opposite longitudinal edges to provide for wing or lap separation, means at another of said stations for trimming the blank adjacent to opposite edges to produce desired blank end formations.

20. A box blank forming or shaping machine, comprising means for feeding individual box blanks, blank conveying means, means for producing longitudinal fold lines in the blanks, work stations, means at each station for stopping and positioning the successive blanks for operations to be performed thereon and for withdrawing said stopping means to permit further blank movement after the operation at said station, means at one of the work stations for slotting the blanks inwardly from opposite longitudinal edges to provide for wing or lap separation, means at another of said stations for trimming the blank adjacent to opposite edges to produce desired blank end formations, and means for producing additional fold lines or creases on the blanks in directions at right angles to the fold lines or creases first mentioned.

21. A box blank forming or shaping machine comprising means for feeding individual box blanks, conveying means arranged to frictionally engage and advance the blanks and to slide frictionally over the blank surfaces when the blank is held stationary, feed rolls intermediate the blank feed means and conveyor for gripping and advancing the successive blanks to the conveyor, means for producing longitudinal fold lines or creases in the blanks during their movement while gripped by said feed rolls, work stations, means at each station for stopping and positioning the successive blanks for operations to be performed thereon and for withdrawing said stopping means to permit further blank movement after the operation at said station, and means at one of the work stations for cutting the blanks laterally from opposite edges to provide for wing or lap separation.

22. A box blank forming or shaping machine comprising means for feeding individual box blanks, conveying means arranged to frictionally engage and advance the blanks and to slide frictionally over the blank surfaces when the blank is held stationary, feed rolls intermediate the blank feed means and conveyor for gripping and advancing the successive blanks to the conveyor, means for producing longitudinal fold lines or creases in the blanks during their movement while gripped by said feed rolls, work stations, means at each station for stopping and positioning the successive blanks for operations to be performed thereon and for withdrawing said stopping means to permit further blank movement after the operation at said station, means at one of the work stations for cutting the blanks laterally from opposite edges to provide for wing or lap separation, and means for producing additional fold lines or creases.

23. A box blank forming or shaping machine comprising means for feeding individual box blanks, conveying means arranged to frictionally engage and advance the blanks and to slide frictionally over the blank surfaces when the blank is held stationary, initial feed rolls intermediate the blank feed means and conveyor for gripping and advancing the successive blanks to the conveyor, means for producing longitudinal fold creases in the blanks during their movement adjacent to said feed rolls, a plurality of work stations, means at each station for stopping and positioning the successive blanks for operations to be performed thereon and for withdrawing said stopping means to permit further blank movement after the operation at said station, means at one of the work stations for slotting the blanks inwardly from opposite longitudinal edges to provide for wing or lap separation, and means at another of said stations for trimming the blank adjacent to said longitudinal edges to produce the desired blank end formations.

24. A box blank forming or shaping machine comprising means for feeding individual box blanks, conveying means arranged to frictionally engage and advance the blanks and to slide frictionally over the blank surfaces when the blank is held stationary, initial feed rolls intermediate the blank feed means and conveyor for gripping and advancing the successive blanks to the conveyor, means for producing longitudinal fold creases in the blanks during their movement adjacent to feed rolls, a plurality of work stations, means at each station for stopping and positioning the successive blanks for operations to be performed thereon and for withdrawing said stopping means to permit further blank movement after the operation at said station, means at one of the work stations for slotting the blanks inwardly from opposite longitudinal edges to provide for wing or lap separation, means at another of said stations for trimming the blank adjacent to said longitudinal edges to produce the desired blank end formations, and means for producing additional fold creases on the blanks at right angles to the creases first mentioned.

25. A box blank forming or shaping machine comprising means for feeding individual box blanks, blank advancing means, means for producing longitudinal fold lines in the blanks during their advance, work stations, means at each station for stopping and positioning the successive blanks for operations to be performed thereon and for withdrawing said stopping means to permit further blank movement after the operations at said station, means at the work stations for operating upon the blanks, means for moving the blanks after the operation at the last work station laterally with reference to the first named blank movement, and means operating upon the blanks during the lateral movement to produce fold lines therein at right angles to the fold lines first mentioned.

26. In a machine of the character described, means for advancing sheet material, two opposite sheet working mechanisms each including a frame, a shaft rotatable therein, a plurality of blank cutters arranged for adjustment in a longitudinal direction, means for driving the cutters in their various adjusted positions, cutter abutments over which the material is positioned, movable stops and means for advancing and retracting the stops.

27. In a machine of the character described, means for advancing blanks, two opposite blank working mechanisms each including a frame, a plurality of blank cutters mounted therein and arranged for adjustment in an axial direction, means for driving the cutters in any of their adjusted positions, cutter abutments over which the blanks are positioned, movable blank stops, means for advancing and retracting the stops, blank clamps for firmly holding the blanks after they have been located by the stops, and means for advancing and retracting the clamps.

28. In a machine of the character described, means for advancing blanks, two opposite blank working mechanisms each including a frame, a shaft rotatable in each frame, a plurality of blank cutters rotatively fixed thereon and arranged for adjustment in an axial direction of said shaft, means for driving the shaft, cutter abutments over which the blanks are positioned, movable blank stops, means for advancing and retracting the stops, blank clamps, means for advancing and retracting the clamps, lateral blank adjusters, means for advancing and retracting the adjusters, and means for adjusting said frames laterally with respect to the direction of blank movement.

29. In a machine of the character described, means for advancing blanks, two opposite blank working mechanisms each including a frame, a shaft rotatably mounted therein, a plurality of blank cutters mounted on the shaft arranged for adjustment in an axial direction and fixed to rotate with said shaft, cutter abutments over which the blanks are positioned, movable blank stops, means for advancing and retracting the stops, two other blank working mechanisms, each of which is arranged substantially in line with one of those first mentioned and each including a frame, a shaft rotatably mounted therein, a blank cutter rotatively connected with said shaft, means for driving the cutter, means for adjusting the cutter longitudinally with respect to the direction of blank movement, a normally fixed, laterally adjustable cutter blade co-operating with the movable blade and over which the blanks are positioned, a movable blank stop and means for advancing and retracting the stop.

30. In a machine of the character described, means for advancing blanks, two opposite blank working mechanisms including a frame, a shaft rotatably mounted therein, a plurality of blank cutters mounted on the shaft arranged for adjustment in an axial direction and fixed to rotate with said shaft, cutter abutments over which the blanks are positioned, movable blank stops, means for advancing and retracting the stops, two other blank working mechanisms, each of which is arranged substantially in line with one of those first mentioned and each including a frame, a shaft rotatably mounted therein, a blank cutter rotatively connected with said shaft, means for driving the cutter, means for adjusting the cutter longitudinally with respect to the direction of blank movement, a normally fixed, laterally adjustable cutter blade cooperating with the movable blade and over which the blanks are positioned, a movable blank stop, means for advancing and retracting the stops, and means for adjusting said frames laterally with respect to the direction of blank movement.

31. In a machine of the character described, means for advancing blanks, and blank working mechanism including a frame, a shaft rotatably mounted therein, one or more blank cutters connected to rotate with said shaft, means for adjusting the cutters longitudinally with respect to the direction of blank movement, a normally fixed laterally adjustable cutter blade co-operating with a movable cutter and over which the blanks are positioned, movable blank stops, means for advancing and retracting the stops, blank clamps, means for advancing and retracting the clamps, lateral blank adjusters, and means for advancing and retracting the adjusters.

32. In a machine of the character described, means for advancing blanks, and blank working mechanism including a frame, a shaft rotatably mounted therein, one or more blank cutters connected to rotate with said shaft, means for adjusting the cutters longitudinally with respect to the direction of blank movement, a normally fixed, laterally adjustable cutter blade co-operating with a movable cutter and over which the blanks are positioned, movable blank stops, means for advancing and retracting the stops, blank clamps, means for advancing and retracting the clamps, lateral blank adjusters, means for advancing and retracting the adjusters, and means for adjusting said frame laterally with respect to the direction of blank movement.

33. In blank shaping machines of the class described, two blank working mechanisms adapted to operate upon the blanks at different work stations, each of said mechanisms including a shaft, a cutter on the shaft, and a complemental normally fixed cutter over which blanks are located in cutting position, the shafts of said mechanisms being arranged in approximate alignment, means for adjusting the mechanisms laterally of the shaft axes, means for driving the shaft of one of the mechanisms, and means connecting the shafts of the mechanisms, said means being constructed and arranged to admit of substantial lateral disalignment of the shafts while one of the shafts is driven from the other.

34. In blank shaping machines of the class described, two blank working mechanisms adapted to operate simultaneously upon blanks at different work stations, each of said mechanisms including a frame, means for adjusting the frames laterally, a shaft rotatably mounted longitudinally in each frame, a cutter on the shaft, and a complemental normally fixed cutter over which blanks are located in cutting position.

35. In blank shaping machines of the class described, two blank working mechanisms adapted to operate simultaneously upon blanks at different work stations, each of said mechanisms including a frame, means for adjusting the frames laterally, a shaft rotatably mounted longitudinally in each frame, a cutter on the shaft, a complemental normally fixed cutter over which blanks are located in cutting position, means for driving one of the shafts, and a drive connection between the shafts, said connection being constructed and arranged to admit of substantial relative lateral adjustment of the frames or units with accompanying disalignment of the shafts while the shafts rotate continuously and one of the pair of coupled shafts is driven from the other.

36. In blank shaping machines of the class described, two blank working mechanisms adapted to operate upon blanks at different work stations, each of said mechanisms including a shaft, a cutter on the shaft, and a complemental normally fixed cutter over which blanks are located in cutting position, the shafts of said mechanisms being arranged in approximate alignment, means for adjusting the mechanisms laterally of the shaft axes, means for driving the shaft of one of the mechanisms, and a flexible coupling connecting the approximately aligned shafts for driving one from the other in different moderately disaligned positions of the shafts.

37. In blank shaping machines of the class described, two blank working mechanisms adapted to operate simultaneously upon blanks at different work stations, each of said mechanisms including a frame, means for adjusting the frame laterally, a shaft rotatably mounted longitudinally in the frame, a cutter on the shaft, and a complemental normally fixed cutter over which blanks are located in cutting position, means for driving one of the shafts, and an approximately universal coupling connecting the variably aligned shafts for driving one from the other in different moderately disaligned positions of the shafts.

38. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, blank positioning means movably mounted on the frame, means for operating said positioning means, the frames of said mechanisms being relatively adjustable laterally of the shaft axes, and driving means connecting said shafts and admitting of reasonable shaft-disalignment.

39. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a blank stop, and a lateral blank adjuster, and means for moving the stop and adjuster to and fro.

40. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a blank stop and a blank clamp movably mounted with respect to said frame, and means for moving them to and fro.

41. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a blank stop, a lateral blank adjuster and a blank clamp movably mounted with respect to said frame, and means for moving them to and fro.

42. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a sub-frame for each of the cutters mounted for adjustment in the main frame in the longitudinal direction of the shaft, means for securing the sub-frames in adjusted position, a lateral blank adjuster mounted for longitudinal movement on one of the sub-frames, and means for moving said adjuster to and fro.

43. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a sub-frame for each of the cutters mounted for adjustment in the main frame in the longitudinal direction of the shaft, means for adjusting the sub-frames, a lateral blank adjuster mounted for longitudinal movement on one of the sub-frames, and means including a cam mounted on said shaft and adjustable thereon for moving said adjuster to and fro.

44. In a blank shaping machine, two blank-working mechanisms each including a frame, a drive shaft rotatively mounted therein, one or more cutters connected to rotate with the shaft and adjustable longitudinally thereon, a complemental fixed cutter for rotating cutter, a sub-frame for each of the cutters mounted for adjustment in the main frame in the longitudinal direction of the shaft, means for securing the sub-frames in adjusted position, a clamp movably mounted on one of said sub-frames, and means for advancing and retracting said clamp.

45. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a sub-frame for each of the cutters mounted for adjustment in the main frame in the longitudinal direction of the shaft, means for securing the sub-frames in adjusted position, a blank clamp member movably mounted on one of said sub-frames, and means including a cam mounted on said shaft and adjustable longitudinally thereof for advancing and retracting said clamp.

46. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a sub-frame for each of the cutters mounted for adjustment in the main frame in the longitudinal direction of the shaft, means for securing the sub-frames in adjusted position, a clamp member movably mounted on one of said sub-frames, and means for advancing and retracting said clamp.

47. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a blank stop movably mounted in relation to the main frame, and means including a cam on said shaft for advancing and retracting the stop.

48. In a blank shaping machine, two blank-working mechanisms each including a frame, a drive shaft rotatively mounted therein, one or more cutters connected to rotate with the shaft and adjustable longitudinally thereon, a complemental fixed cutter for a rotating cutter, a sub-frame for each of the cutters mounted for adjustment in the main frame in the longitudinal direction of the shaft, means for securing the sub-frames in adjusted position, a clamp movably mounted on one of said sub-frames, means for advancing and retracting said clamp, a blank stop movably mounted in relation to the main frame, and means for advancing and retracting the stop.

49. In mechanism of the class described, blank working mechanism comprising a frame, a shaft rotatively mounted in the frame, a normally fixed cutter blade adjustably secured in the frame with relation to the shaft, a cutter disc on the shaft connected to rotate therewith and adjustable longitudinally thereof, said disc having a projecting portion with a cutting edge substantially tangential to the disk, arranged to make a shearing cut in co-operation with said normally fixed cutter blade.

50. In mechanism of the class described, blank working mechanism comprising a frame, a shaft rotatively mounted in the frame, a normally fixed cutter blade adjustably secured in the frame with relation to the shaft, a moving cutter blade connected to rotate with said shaft and adjustable longitudinally thereon, the cutting edge of said blade being arranged to make a shearing cut in material located upon the normally fixed blade, the cutting edges of the blades being arranged in generally parallel relation to the shaft.

51. In mechanism of the class described, blank working mechanism comprising a frame, a shaft rotatively mounted in the frame, a normally fixed cutter blade, one or more blade arms, each having a hub located on the shaft and adjustable longitudinally thereof, and a cutter blade detachably secured to one of said arms and co-operating with the fixed blade.

52. In mechanism of the class described, blank working mechanism comprising a frame, a shaft revolubly mounted in the frame, a normally fixed cutter blade, one or more blade arms, each having a hub located on the shaft and adjustable longitudinally thereof, means for securing the hubs in adjusted position, and cutter blades arranged for detachable connection to said arms and adapted to co-operate with the normally fixed cutter blade, the moving blades being capable of arrangement to trim or cut different portions of blanks positioned above the fixed cutter blades.

53. In mechanism of the class described, blank working mechanism comprising a frame, a shaft revolubly mounted in the frame, a normally fixed cutter blade, one or more arms, each having a hub located on the shaft and adjustable longitudinally thereof, and cutter blades detachably secured to said arms to co-operate with the normally fixed cutter blade, the moving blades being capable of arrangement to trim or cut different wings or lap portions of blanks positioned above the fixed cutter blades.

54. A machine of the class described, comprising means for advancing material through operating stations, means at a station for slotting the material, means at another station for trimming the slotted portions, means for moving the material in a direction substantially at right angles to the first-mentioned advance, and means acting to produce fold creases upon the material during its advance in both directions.

55. In a machine of the character described, means for advancing blanks, and blank working mechanism including a frame, a shaft rotatably mounted therein, one or more blank cutters connected to rotate with said shaft, means for adjusting the cutters longitudinally with respect to the direction of blank movement, a normally fixed, laterally adjustable cutter blade cooperating with a movable cutter and over which the blanks are positioned, movable blank stops, means for advancing and retracting the stops, blank clamps, and means for advancing and retracting the clamps.

Signed at New York city, in the county of New York and State of New York this 22nd day of October A. D. 1925.

HARRY BRIDGMAN SMITH.